US011247255B2

(12) United States Patent
Lim

(10) Patent No.: US 11,247,255 B2
(45) Date of Patent: Feb. 15, 2022

(54) LETTER BOX WITH AUTO RIVETING

(71) Applicant: Seoul Laser Dieboard System Co., Ltd., Lake Forest, CA (US)

(72) Inventor: Kyong Chan Lim, San Diego, CA (US)

(73) Assignee: SEOUL LASER DIEBOARD SYSTEM CO., LTD., Lake Forest, CA (US)

(*) Notice: Subject to any disclaimer, the term of this patent is extended or adjusted under 35 U.S.C. 154(b) by 207 days.

(21) Appl. No.: 16/172,558

(22) Filed: Oct. 26, 2018

(65) Prior Publication Data

US 2019/0126338 A1 May 2, 2019

Related U.S. Application Data

(60) Provisional application No. 62/578,272, filed on Oct. 27, 2017.

(51) Int. Cl.
| | |
|---|---|
| *B21D 28/04* | (2006.01) |
| *B21D 5/00* | (2006.01) |
| *B21D 21/00* | (2006.01) |
| *G09F 7/16* | (2006.01) |
| *B23Q 3/18* | (2006.01) |

(Continued)

(52) U.S. Cl.
CPC ............... *B21D 28/04* (2013.01); *B21D 5/00* (2013.01); *B21D 21/00* (2013.01); *B21D 28/26* (2013.01); *B21D 35/00* (2013.01); *B23P 15/00* (2013.01); *B23Q 3/18* (2013.01); *B23Q 15/22* (2013.01); *B23Q 27/00* (2013.01); *B29C 53/00* (2013.01);

(Continued)

(58) Field of Classification Search
CPC . B21D 5/00; B21D 5/006; B21D 5/16; B21D 28/04; B21D 28/24; B21D 28/26; B21D 28/265; B21D 35/00; B21D 35/001; B21D 39/02; B21D 39/028; B23P 15/00
See application file for complete search history.

(56) References Cited

U.S. PATENT DOCUMENTS 3,327,764 A * 6/1967 Mccabe .................... A62C 2/16
160/5
3,327,766 A * 6/1967 Kurz ......................... E06B 3/96
160/381

(Continued)

*Primary Examiner* — Edward T Tolan
(74) *Attorney, Agent, or Firm* — Procopio, Cory, Hargreaves & Savitch, LLP

(57) ABSTRACT

An apparatus to produce a letterbox using a strip of material includes: a bender to receive and bend the strip of material into a desired shape of a letterbox including flanges and notches, and the bender to bend at least one end of the strip of material slightly to produce a slight bent; a processor to measure a first plurality of hole positions on a first end of the strip of material and a second plurality of hole positions on flanges of the strip of material, wherein the first plurality of hole positions on the first end are measured to match a first plurality of holes on a second end of the strip of material, wherein the second plurality of hole positions on the flanges are measured to match a second plurality of holes on a base plate; and a puncher to punch the first plurality of holes on at least one of the first end and the second end of the strip of material according to the first plurality of hole positions, and the puncher to punch the second plurality of holes on the flanges according to the second plurality of hole positions.

7 Claims, 17 Drawing Sheets

(51) Int. Cl.
*B23Q 15/22* (2006.01)
*B23Q 27/00* (2006.01)
*B21D 28/26* (2006.01)
*G09F 13/04* (2006.01)
*B21D 35/00* (2006.01)
*B29C 53/40* (2006.01)
*B29C 53/00* (2006.01)
*B23P 15/00* (2006.01)
*B29C 65/00* (2006.01)

(52) U.S. Cl.
CPC ................ *B29C 53/40* (2013.01); *G09F 7/16* (2013.01); *G09F 13/0404* (2013.01); *B29C 65/00* (2013.01)

(56) References Cited

U.S. PATENT DOCUMENTS

| | | | | |
|---|---|---|---|---|
| 3,580,040 A * | 5/1971 | Lang | .................... | B21D 28/265 |
| | | | | 72/324 |
| 3,768,223 A * | 10/1973 | Kurz | ................... | A62C 2/16 |
| | | | | 52/658 |
| 3,879,979 A * | 4/1975 | Arai | ..................... | B21D 53/74 |
| | | | | 72/338 |
| 3,986,470 A * | 10/1976 | Berry | ................... | B21C 37/104 |
| | | | | 72/326 |
| 4,061,064 A * | 12/1977 | Kindgren | ............. | B21D 28/243 |
| | | | | 83/368 |
| 4,269,255 A * | 5/1981 | Nailor | .................... | A62C 2/12 |
| | | | | 160/1 |
| 4,328,694 A | 5/1982 | Beaumont | | |
| 4,392,317 A | 7/1983 | Boothman | | |
| 5,377,516 A | 1/1995 | Lipari | | |
| 5,456,099 A | 10/1995 | Lipari | | |
| 5,560,110 A * | 10/1996 | Haines | .................... | B26D 5/18 |
| | | | | 30/358 |
| 5,619,013 A | 4/1997 | Jorgensen | | |
| 5,697,138 A | 12/1997 | Swanson et al. | | |
| 5,881,591 A * | 3/1999 | Ondracek | ................ | B21D 5/04 |
| | | | | 72/14.9 |
| 5,970,769 A | 10/1999 | Lipari | | |
| 6,003,358 A | 12/1999 | Lipari et al. | | |
| 6,167,740 B1 | 1/2001 | Lipari | | |
| 6,360,420 B2 * | 3/2002 | Shah | ................... | E06B 3/67313 |
| | | | | 29/428 |
| 6,523,575 B1 | 2/2003 | Mrsny | | |
| 6,915,579 B2 * | 7/2005 | Cofer | ................... | B21D 28/265 |
| | | | | 30/233 |
| 9,921,571 B2 * | 3/2018 | Crowley | ............ | B23Q 17/2233 |
| 2004/0031177 A1 | 2/2004 | Gordon et al. | | |
| 2005/0005746 A1 | 1/2005 | Linenberger | | |
| 2012/0324705 A1 | 12/2012 | Lim et al. | | |
| 2015/0170553 A1 | 6/2015 | Lim | | |
| 2015/0224555 A1 | 8/2015 | Lim | | |
| 2016/0159060 A1 | 6/2016 | Lim | | |
| 2016/0225295 A1 | 8/2016 | Yoon | | |
| 2016/0256966 A1 | 9/2016 | Lim | | |
| 2016/0297015 A1 | 10/2016 | Lee | | |

* cited by examiner

LETTER BOX WITH AUTO RIVETING

CROSS-REFERENCE TO RELATED APPLICATIONS

This application claims the benefit of priority under 35 U.S.C. § 119(e) of U.S. Provisional Patent Application No. 62/578,272, filed Oct. 27, 2017, entitled "Letter Box with Auto Riveting." The disclosure of the above-referenced application is incorporated herein by reference.

BACKGROUND

Technological Field

The present disclosure relates to three-dimensional signage displays, and more specifically, to automatic riveting of a letter box using a new process.

Background

Three-dimensional signage displays are installed to inform the consumers of the name and nature of the businesses. Thus, the signage displays enable the consumers to easily recognize and understand the nature of the businesses. The signage displays include illumination units to easily identify the businesses during the day as well as night time.

SUMMARY

This disclosure describes a new process for making holes that enable easier attachment of the ends of the side frame of a letter box and easier fixing of a base plate to the flanges of the letter box than the conventional processes. The process also describes a corresponding apparatus that performs the new process.

In one implementation, an apparatus configured to produce a letterbox using a strip of material is disclosed. The apparatus includes: a bender configured to receive and bend the strip of material into a desired shape of a letterbox including flanges and notches, the bender also configured to bend at least one end of the strip of material slightly to produce a slight bent; a processor configured to measure a first plurality of hole positions on a first end of the strip of material and a second plurality of hole positions on flanges of the strip of material, wherein the first plurality of hole positions on the first end are measured to match a first plurality of holes on a second end of the strip of material, wherein the second plurality of hole positions on the flanges are measured to match a second plurality of holes on a base plate; and a puncher configured to punch the first plurality of holes on at least one of the first end and the second end of the strip of material according to the first plurality of hole positions, the puncher also configured to punch the second plurality of holes on the flanges according to the second plurality of hole positions.

In another implementation, a method for producing a letterbox using a strip of material is disclosed. The method includes: receiving and bending the strip of material into a desired shape of a letterbox including flanges and notches; bending at least one end of the strip of material slightly to produce a slight bent; measuring a first plurality of hole positions on a first end of the strip of material and a second plurality of hole positions on flanges of the strip of material, wherein the first plurality of hole positions on the first end are measured to match a first plurality of holes on a second end of the strip of material, wherein the second plurality of hole positions on the flanges are measured to match a second plurality of holes on a base plate; punching the first plurality of holes on at least one of the first end and the second end of the strip of material according to the first plurality of hole positions; and punching the second plurality of holes on the flanges according to the second plurality of hole positions.

Other features and advantages of the present disclosure should be apparent from the following description which illustrates, by way of example, aspects of the disclosure.

BRIEF DESCRIPTION OF THE DRAWINGS

The details of the present disclosure, both as to its structure and operation, may be gleaned in part by study of the accompanying drawings.

DETAILED DESCRIPTION

Figure 1:
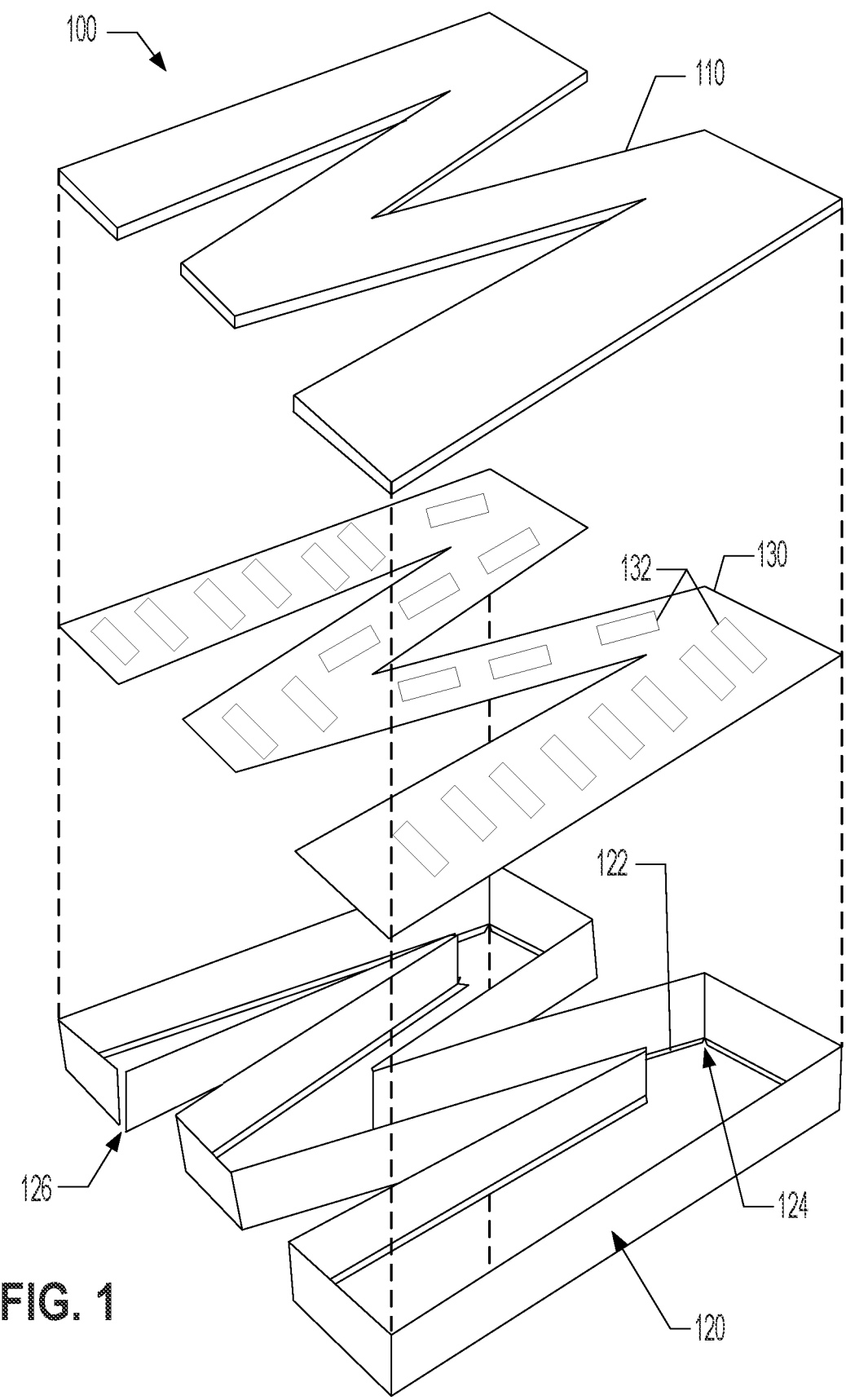
FIG. 1 shows a typical three-dimensional signage display.

A typical three-dimensional signage 100 is described with reference to FIG. 1. The typical three-dimensional signage 100 includes a side frame 120 with a tubular opening (sometimes referred to as "a letter box"), an upper panel and cover 110 (which rests on top of the side frame 120), and a base plate 130 which includes illumination devices 132 such as light emitting diodes (LEDs).

The side frame 120 can be formed with a strip of metallic material such as aluminum or steel. In some cases, the side frame 120 can be formed with a strip of non-metallic material such as plastic. Thus, a bender bends the strip of material into a three-dimensional shape such that the light from the illumination devices is transmitted through the upper panel 110 to light the three-dimensional signage 100. The bending process may also include flanging (i.e., folding of one side of the side frame 120) to form flanges 122 and notching (i.e., V-cutting or V-stamping) to form notches 124.

Once the side frame 120 is formed into a particular shape, the base plate 130 is inserted into the letter box and is made to rest on the flange 122. Further, the ends 126 of the side frame 120 are attached using adhesive or by welding. The base plate 130 is fixed to the letter box using adhesive or by manually drilling holes through the base plate 130 into the flange 122. However, the process of attaching the ends 126 of the side frame 120 and fixing the base plate 130 to the flange 122 can be a very cumbersome process which may take a long time and the end product may not look very aesthetically pleasing.

This disclosure describes a new process for making holes that enable easier attachment of the ends of the side frame of a letter box and easier fixing of a base plate to the flanges of the letter box than the conventional processes. The process also describes a corresponding apparatus that performs the new process. The detailed description set forth below, in connection with the accompanying drawings, is intended as a description of various implementations and is not intended to represent the only implementations in which the disclosure may be practiced. The detailed description includes specific details for the purpose of providing a thorough understanding of the implementations. In some instances, well-known structures and components are shown in simplified form for brevity of description. As used herein, like reference numerals refer to like features throughout the written description.

Figure 2A:
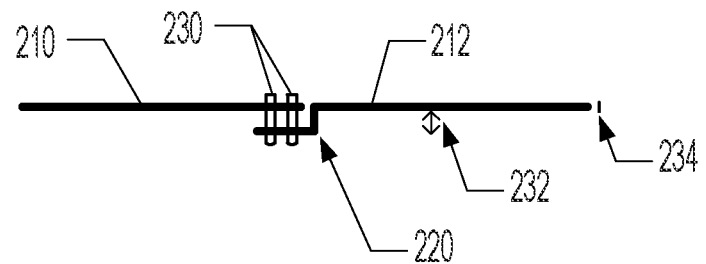
FIG. 2A shows one implementation of a process for attaching the two ends of a side frame.

FIG. 2A shows one implementation of a process for attaching the two ends 210, 212 of the side frame (similar to the side frame 120). In the illustrated implementation of FIG. 2A, the first end 212 is slightly bent 220 so that the second end 210 can be positioned next to the first end 212 for attachment. This process of slightly bending the first end 212 can be done during the bending process by the bender 250, but before the completion of the three-dimensional shape using the side frame. In one implementation, the thickness 232 of the slight bent is in the order of the thickness 234 of the ends of the side frame 210, 212. That is, in one implementation, the thickness 232 of the slight bent can be between the thickness 234 and five times the thickness 234.

The bender 250 can also be coupled to an automatic hole puncher (not shown) that makes holes 214 at appropriate places (measured by a processor and fed in by a feeder associated with the bender) where the ends 210, 212 overlap so that the rivets or screws 230 can be inserted into the holes to fasten the two ends 210, 212 once the three-dimensional shape has been completed. In another implementation, the slight bending can be done at either end (e.g., at the second end 210) or both ends (both ends 212, 210) of the side frame.

Figure 2B:
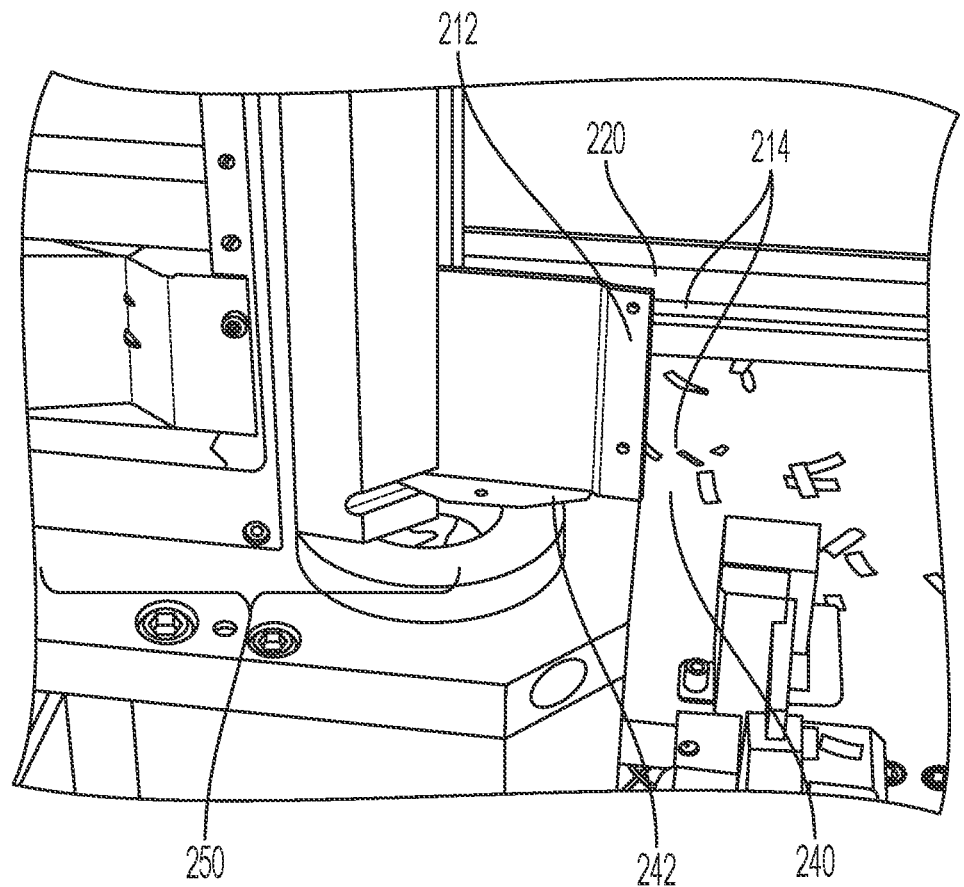
FIG. 2B shows the process of slightly bending the first end at a particular position using the bender in accordance with one implementation of the present disclosure.

FIG. 2B shows the process of slightly bending the first end 212 at position 220 using the bender 250 in accordance with one implementation of the present disclosure. It should be noted that the portion 240 (where the first end 212 is slightly bent) does not have a flange portion 242. Thus, the tip 240 of the first end 212 should be cut at the beginning so that the first end 212 can receive the second end 210 without any problem.

Figure 3A:
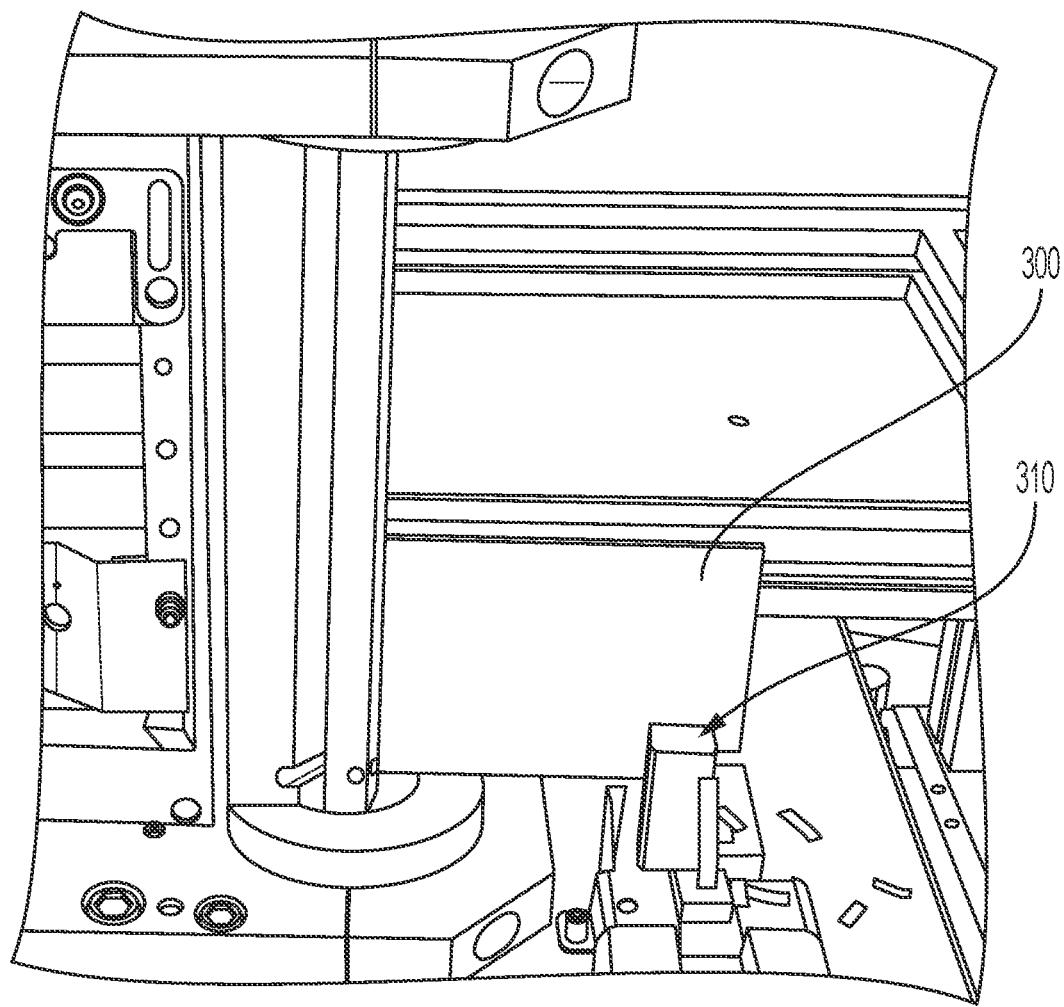
FIG. 3A shows a cutting device used in cutting the tip of the first end prior to the slight bending in accordance with one implementation of the present disclosure.
Figure 3B:
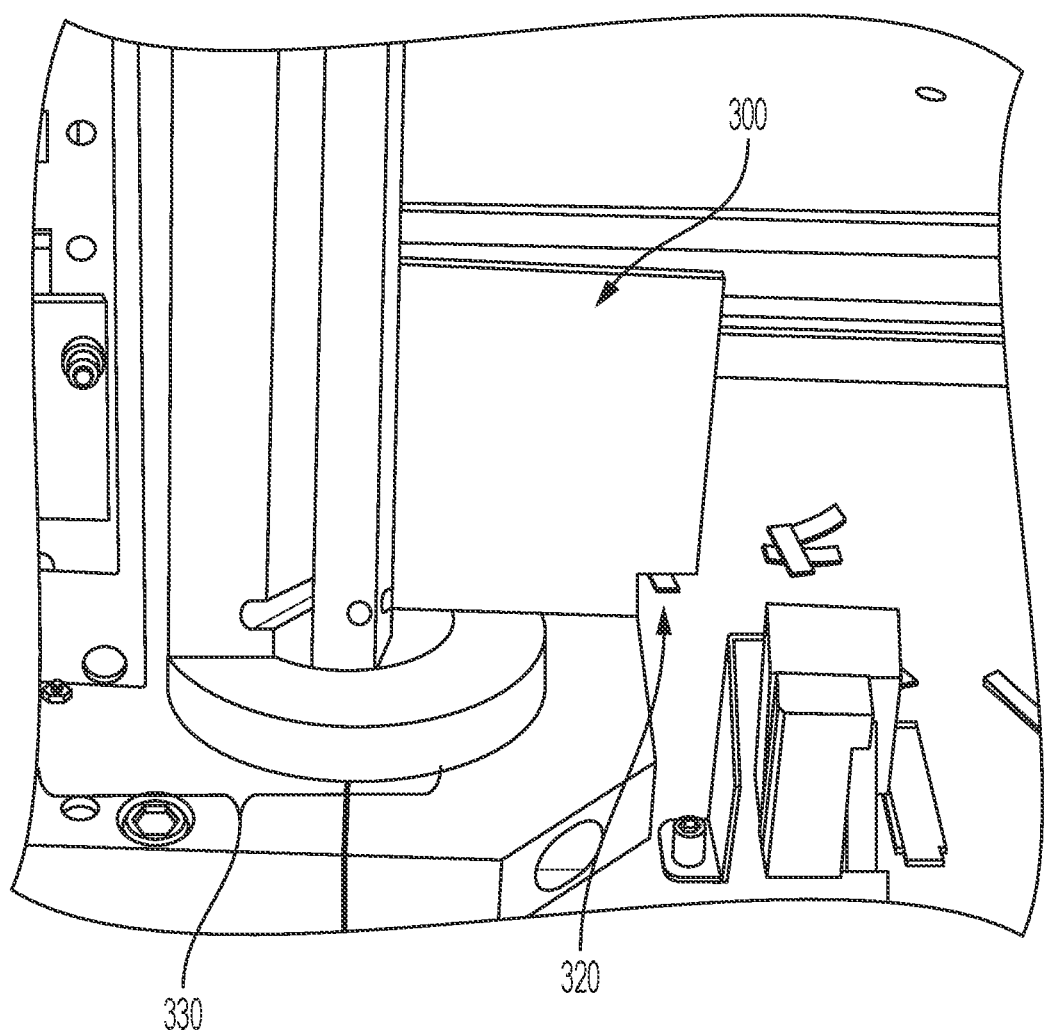
FIG. 3B shows the cut made by the cutting device on the tip of the first end prior to the slight bending in accordance with one implementation of the present disclosure.

FIGS. 3A and 3B show the process of cutting the tip of the first end 300 prior to the slight bending so that the tip will not have a flange in accordance with one implementation of the present disclosure. FIG. 3A shows a cutting device 310 used in cutting the tip of the first end 300 prior to the slight bending in accordance with one implementation of the present disclosure. FIG. 3B shows the cut 320 made by the cutting device 310 on the tip of the first end 300 prior to the slight bending in accordance with one implementation of the present disclosure. The cut 320 at the bottom portion of the tip of the first end 300 is made so that the tip can overlap with the tip of the other end. The bender 330 may then perform other functions including flanging, notching, and nicking. As described above in relation to FIG. 1, flanging includes folding of one side of the side frame (e.g. element 120) to form a flange 122, while notching includes V-cutting or V-stamping where the side frame is bent to form a notch 124.

Figure 4:
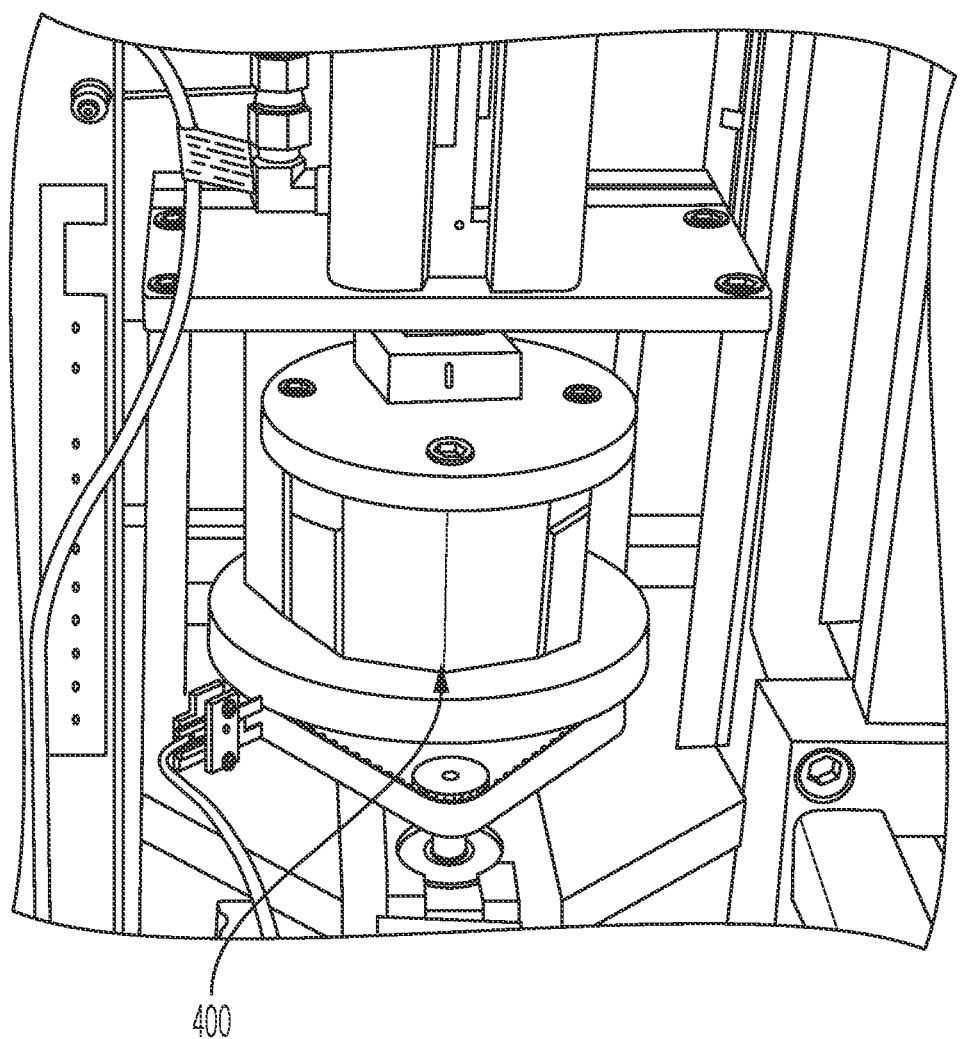
FIG. 4 shows a rotatable V-cut punch for performing notching in accordance with one implementation of the present disclosure.

FIG. 4 shows a rotatable V-cut punch 400 for performing notching in accordance with one implementation of the present disclosure. The result of the notching produces notches (e.g., a notch 124 shown in FIG. 1 or a notch 522 shown in FIG. 5). The punch 400 includes a plurality of differently-sized punches so that the notches of different angles can be made.

Figure 5:
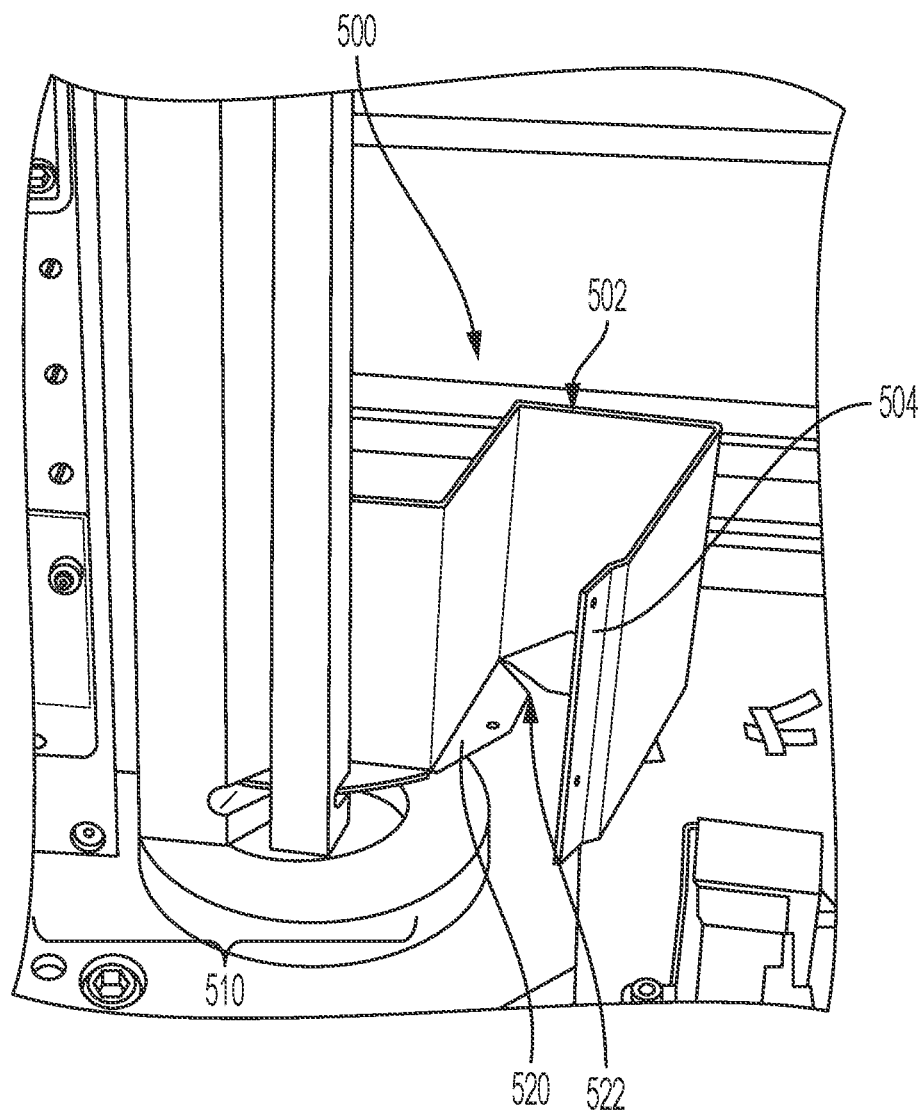
FIG. 5 shows the process of bending the side frame into a letter box in accordance with one implementation of the present disclosure.

FIG. 5 shows the process 500 of bending the side frame 502 into a letter box in accordance with one implementation of the present disclosure. In the illustrated implementation of FIG. 5, the side frame 502 is in the process of being bent by a bender 510. FIG. 5 also shows the letter box including the bent side frame 502, flanges 520, and the slight bent tip 504 of the first side.

Figure 6:
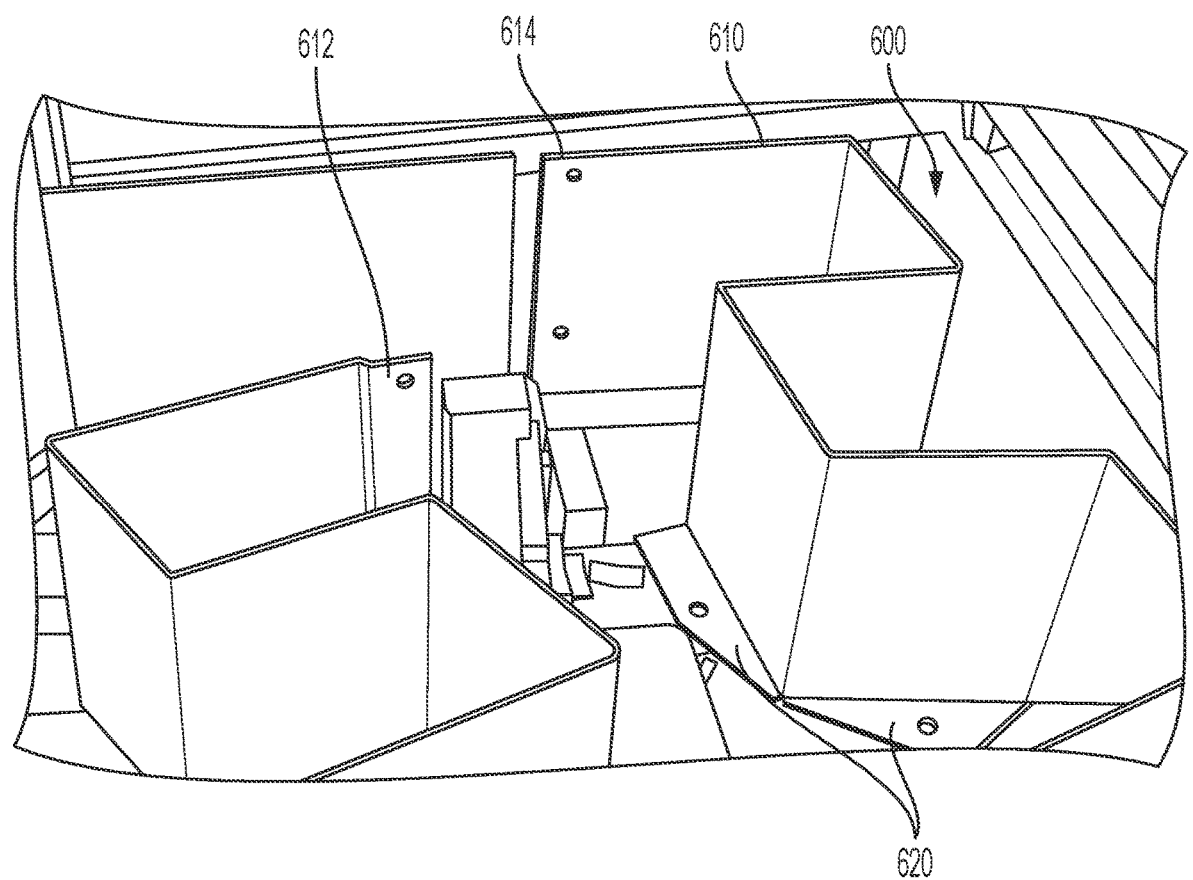
FIG. 6 is a side perspective view of the letter box bent into a shape by a bender in accordance with one implementation of the present disclosure.

FIG. 6 is a side perspective view of the letter box 600 bent into a shape by a bender in accordance with one implementation of the present disclosure. FIG. 6 also shows the side frame 610 including a tip 612 of the first end (slightly bent end), a second 614, and the flanges 620. The two ends 612, 614 include matching holes to receive the fasteners (e.g., screws, nails, and/or rivets) to close and complete the letter box 600. The flanges 620 also include holes which are measured (e.g., by a processor coupled to the bender) and punched (e.g., by a hole puncher coupled to the bender) at appropriate places to match the holes in the base plate (e.g., base plate 130 shown in FIG. 1).

In one implementation, the holes are punched at appropriate places prior to the process of bending the side frame 610. In another implementation, the holes are punched at appropriate places during the process of bending the side frame 610.

Figure 7:
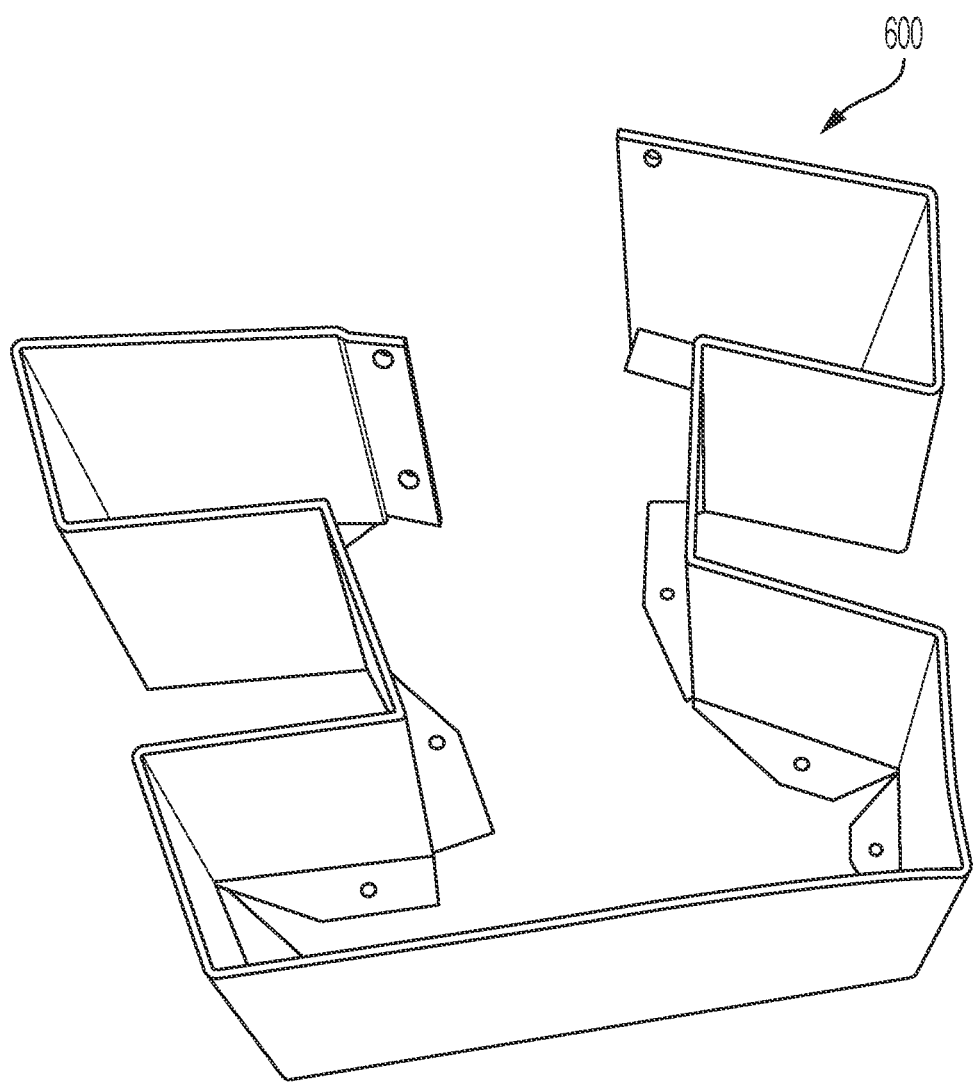
FIG. 7 is a top perspective view of the letter box bent into a shape by a bender in accordance with one implementation of the present disclosure.

FIG. 7 is a top perspective view of the letter box 600 bent into a shape by a bender in accordance with one implementation of the present disclosure.

Figure 8:
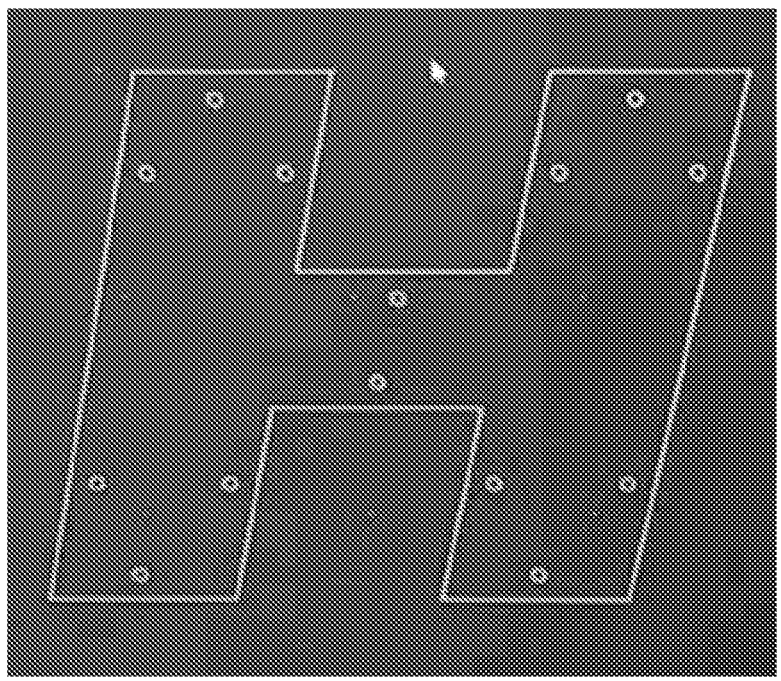
FIGS. 8 and 9 show computer displays (e.g., of a bender) of the base plate with holes so that a processor (e.g., coupled to the bender) can measure and a device (e.g., a puncher) can form/punch the holes on the base plate.
Figure 9:
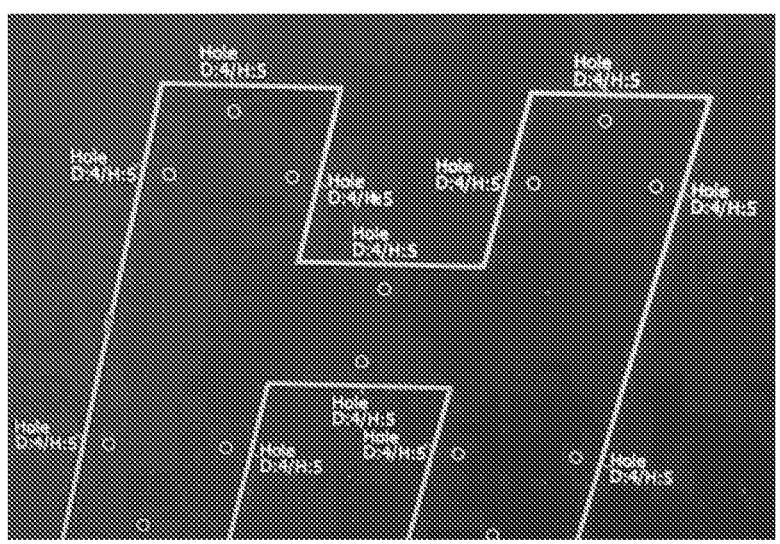

FIGS. 8 and 9 show computer displays (e.g., of a bender) of the base plate with holes so that a processor (e.g., coupled to the bender) can measure and a device (e.g., a puncher) can form/punch the holes on the base plate. The holes on the base plate are formed to match the holes on the flanges of the completed letter box.

Figure 10:
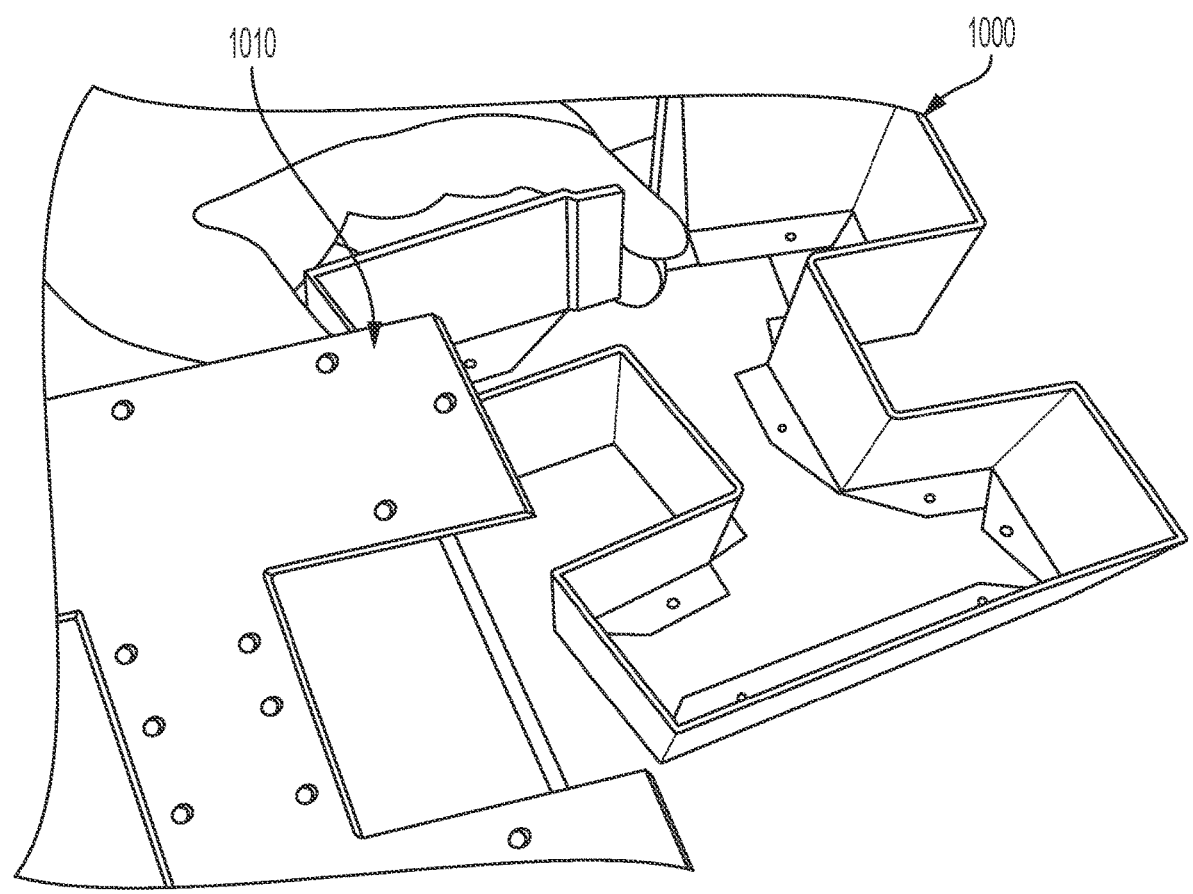
FIG. 10 shows the base plate being inserted into the completed letter box so that it can be attached with rivets or screws.

FIG. 10 shows the base plate 1010 being inserted into the completed letter box 1000 so that it can be attached with rivets or screws.

Figure 11:
FIG. 11 is a top view of the letterbox being completed by pulling the two ends of the side frame together by aligning the holes on the two ends.

FIG. 11 is a top view of the letterbox 1100 being completed by pulling the two ends 1110 of the side frame together by aligning the holes on the two ends.

Figure 12:
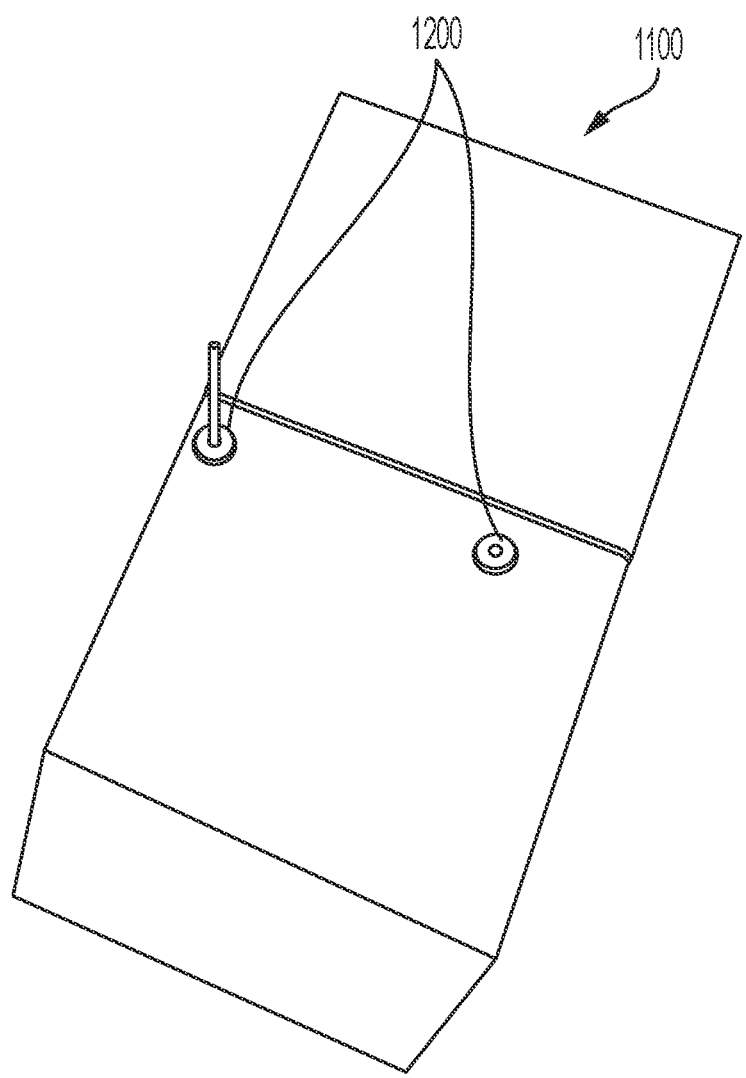
FIG. 12 is a top view of the letterbox being completed by riveting the two ends with rivets.

FIG. 12 is a top view of the letterbox 1100 being completed by riveting the two ends with rivets 1200. As shown in FIG. 12, the rivets 1200 are inserted into the aligned holes.

Figure 13:
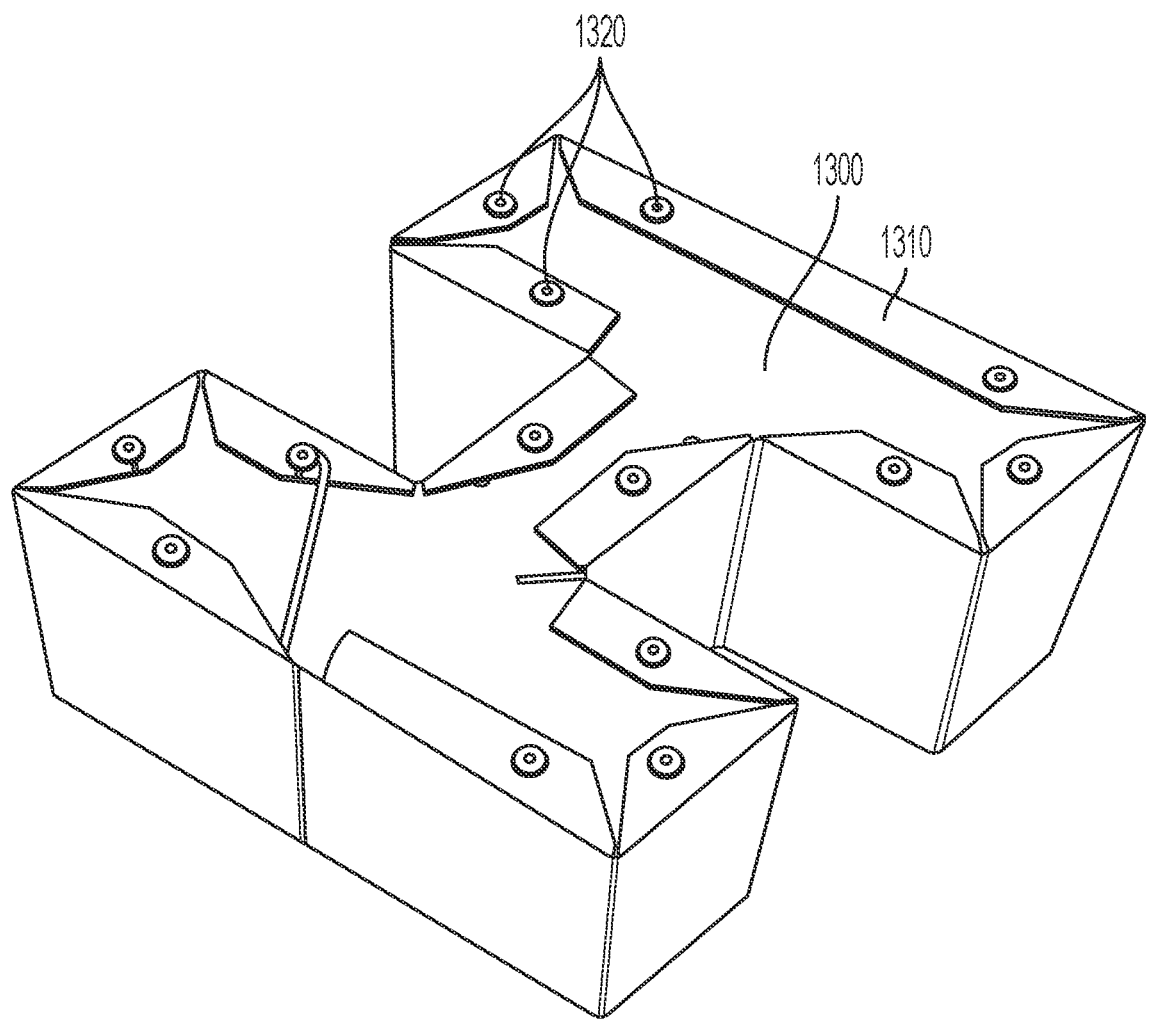
FIG. 13 is a top perspective view of the back side of the letter box with a base plate attached to the flange with rivets.

FIG. 13 is a top perspective view of the back side of the letter box with a base plate 1300 attached to the flange 1310 with rivets 1320.

Figure 14:
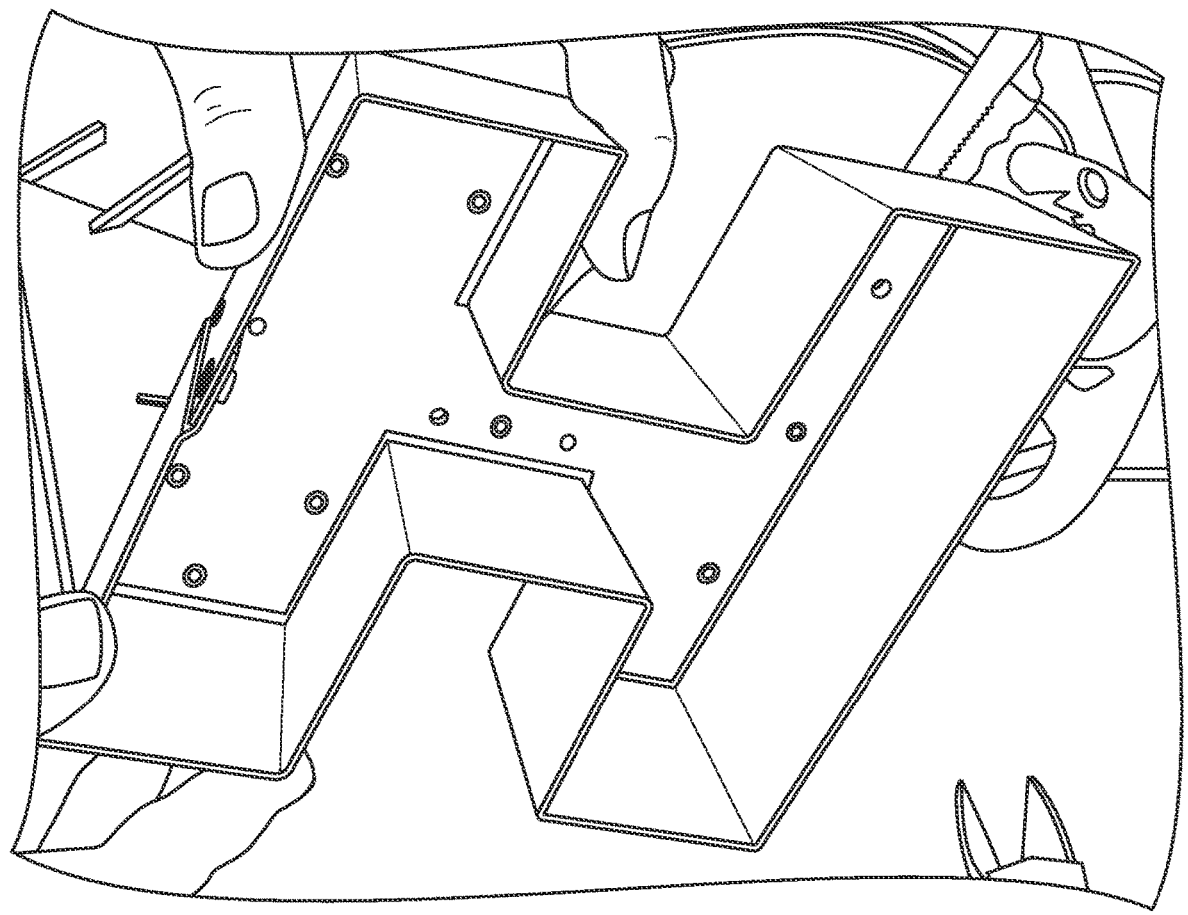
FIG. 14 is a perspective view of the front side of the letterbox with the base plate inserted into the letter box.

FIG. 14 is a perspective view of the front side of the letterbox with the base plate inserted into the letter box.

Figure 15:
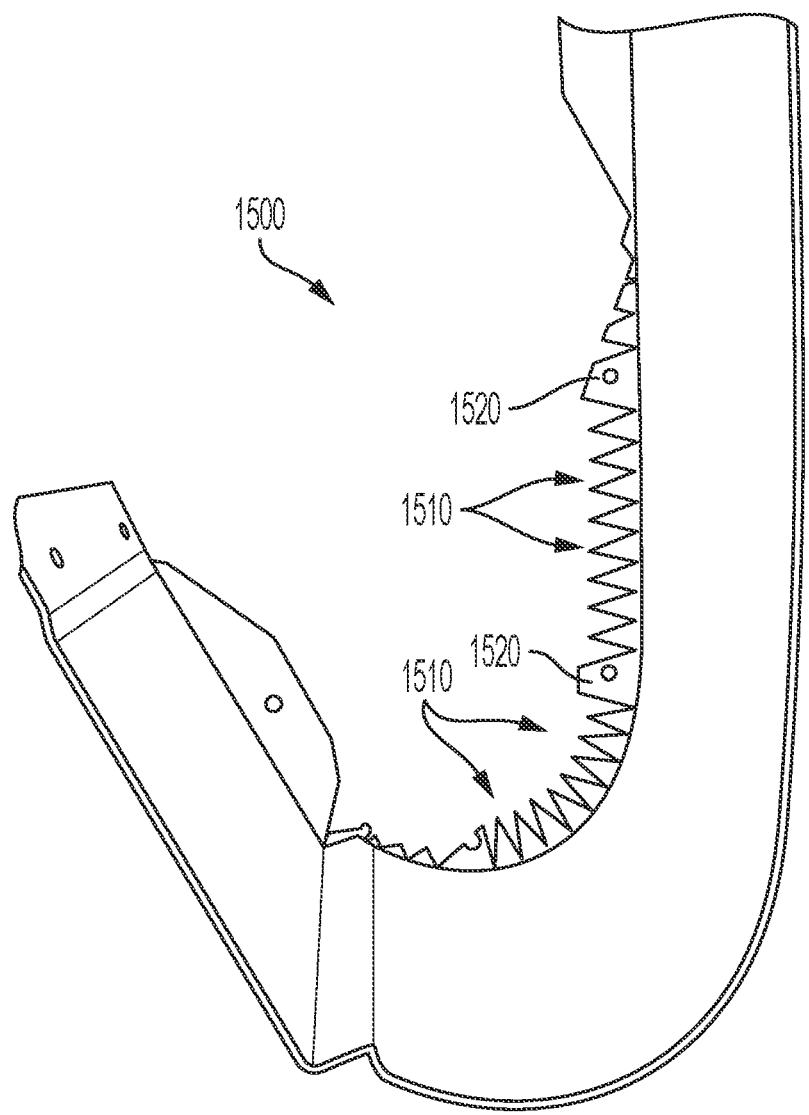
FIG. 15 shows a letter box with a non-ordinary shape such that there are multiple notching marks on the flange.

FIG. 15 shows a letter box 1500 with a non-ordinary shape such that there are multiple notching marks 1510 on the flange. In this case, a bender can be programmed to leave some areas 1520 of the flange which can receive rivet holes.

Figure 16:
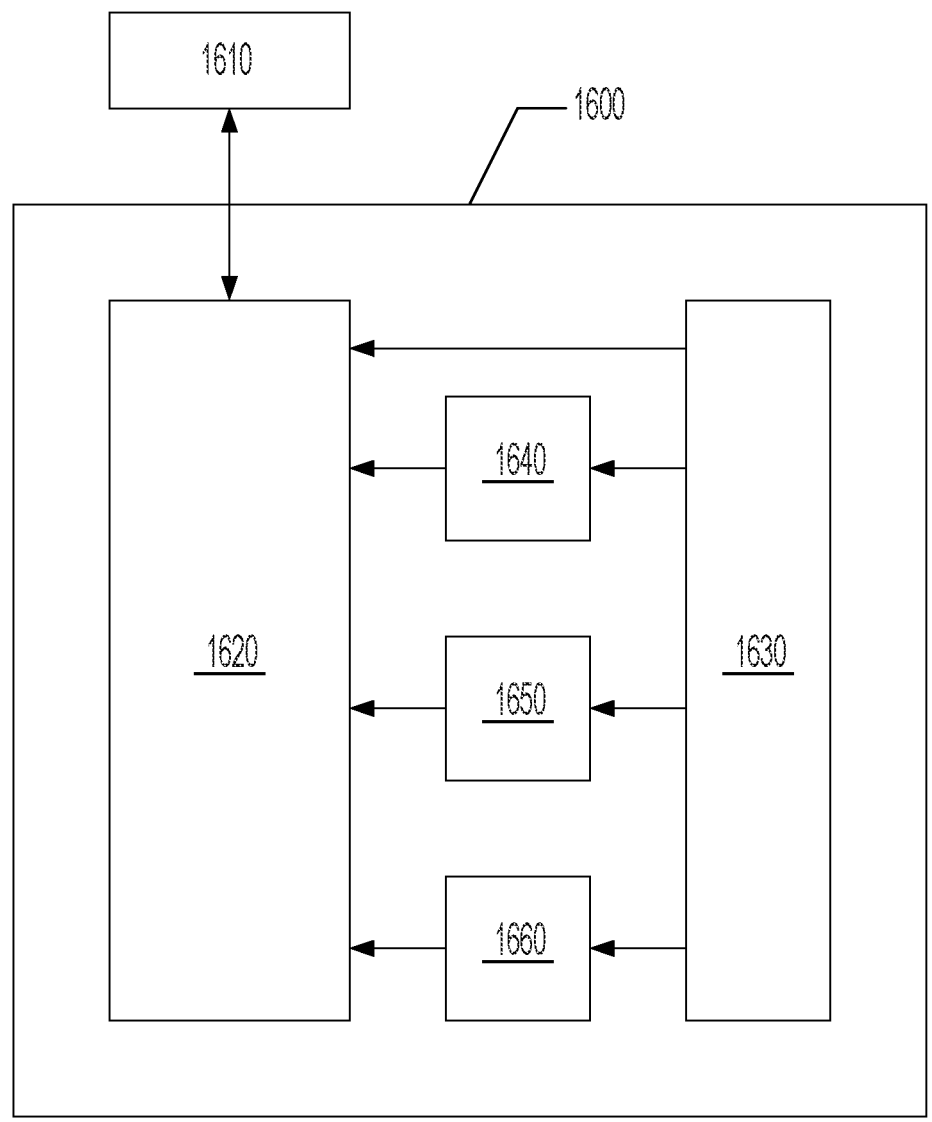
FIG. 16 is a block diagram of an apparatus configured to produce a letterbox using a strip of material in accordance with one implementation of the present disclosure.

FIG. 16 is a block diagram of an apparatus 1600 configured to produce a letterbox using a strip of material 1610 in accordance with one implementation of the present disclosure.

In one implementation, the strip of material 1610 is metallic material such as aluminum or steel. In another implementation, the strip of material 1610 is non-metallic material such as plastic. In one implementation, the apparatus 1600 is configured to produce the letterbox using the strip of material 1600 which includes holes that are made to enable easier attachment of the ends of the strip of material 1600 and to enable easier fixing of a base plate to the flanges of the letter box than the conventional processes.

In the illustrated implementation of FIG. 16, the apparatus 1600 includes a bender 1620, a processor 1630, a least one cutting device 1640, 1650, and a puncher 1660 (e.g., a hole puncher). In one implementation, the bender 1620 is configured to receive the strip of material 1610 and bend it into a desired shape of a letterbox including flanges and notches. The bender 1620 is also configured to bend the one end of the strip of material 1610 slightly as described in relation to FIGS. 2A and 2B. In one implementation, the processor 1630 is configured to measure the hole positions on one end and flanges of the strip of material 1610 that match holes on the other end and a base plate. The processor 1630 can also be configured to measure the hole positions on the other end and the base plate.

In one implementation, the cutting device 1640 is similar to the cutting device 310 configured to cut the bottom portion of the tip (the portion where the flange would be) of one end of the strip of material. In another implementation, the cutting device 1650 is similar to the cutting device 400 configured as a rotatable V-cutter/stamp/punch for performing notching which produces notches (e.g., notches 124, 522). In one implementation, the puncher 1660 is configured to form and/or punch the holes on at least one end of the strip of material 1610 and the flanges according to the hole positions measured by the processor 1630. The puncher 1660 may also be configured to form and/or punch the holes on the base plate to match the holes on the flanges of the completed letter box. In one implementation, the holes are formed and/or punched at appropriate places prior to the process of bending the strip of material 1610. In another implementation, the holes are formed and/or punched at appropriate places during the process of bending the strip of material 1610.

Figure 17:
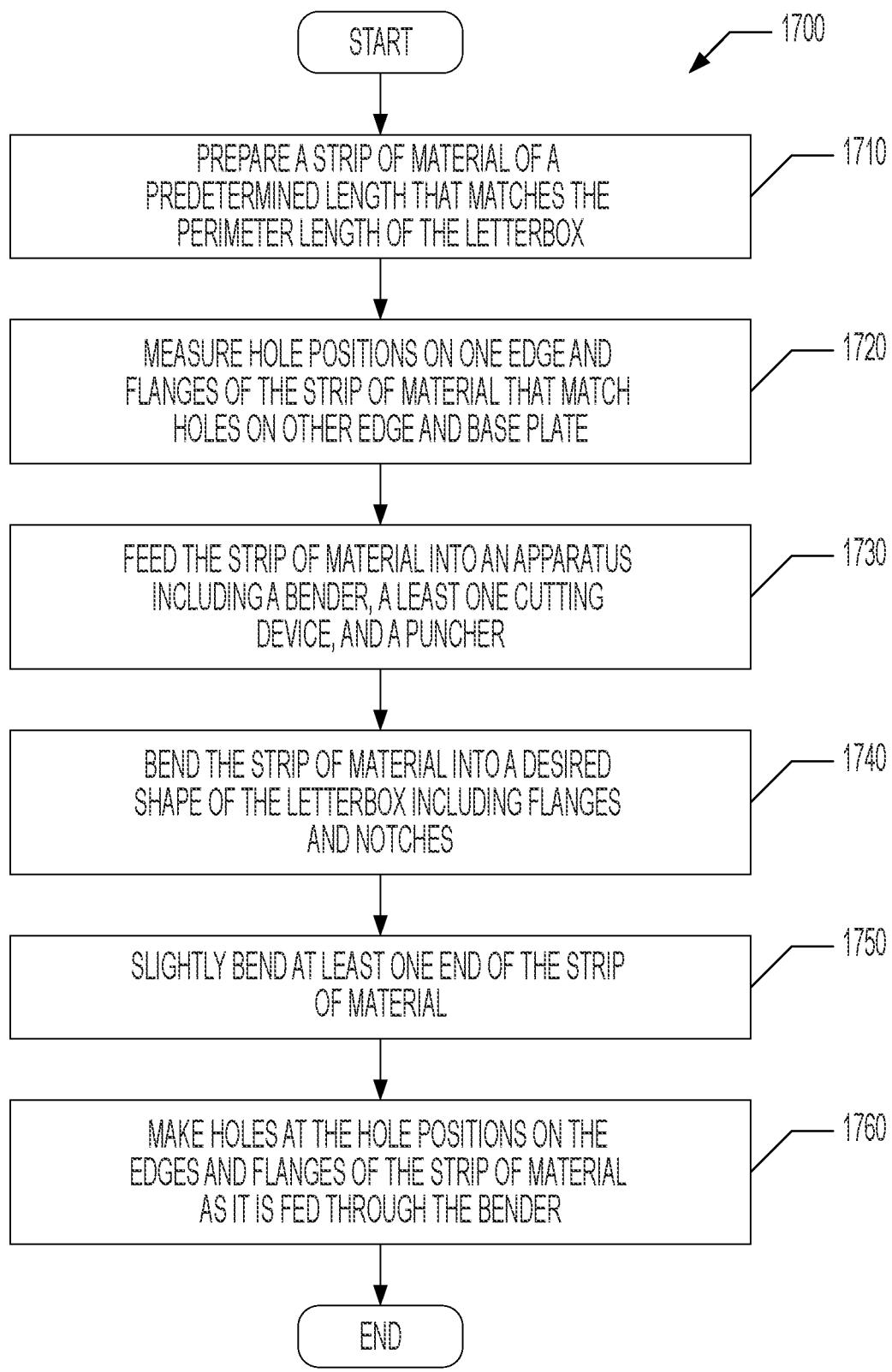
FIG. 17 is a flow diagram summarizing the process for making holes that enable easier attachment of the ends of the side frame of a letter box and easier fixing of a base plate to the flanges of the letter box than the conventional processes.

FIG. 17 is a flow diagram summarizing a process 1700 for making holes that enable easier attachment of the ends of a side frame of a letter box and easier fixing of a base plate to the flanges of the letter box than the conventional processes in accordance with one implementation of the present disclosure. In one implementation, the side frame is referred to as "a strip of material".

In the illustrated implementation of FIG. 17, the process 1700 includes preparing, at box 1710, a strip of material of a predetermined length that matches the perimeter length of the letterbox. The process 1700 also includes measuring the hole positions on one end and flanges of the strip of material that match holes on the other end and the base plate, at box 1720. The strip of material is fed into an apparatus, at box 1730. As shown in FIG. 16, in one implementation, the apparatus includes a bender, a processor, a least one cutting device, and a puncher. The strip of material is then bent, at box 1740, into a desired shape of the letterbox including flanges and notches. The at least one end of the strip of material is slightly bent, at box 1750, and the holes are made at the hole positions on the ends and flanges of the strip of material, at box 1760, as the strip of material is fed through the bender.

The above descriptions of the disclosed implementations are provided to enable any person skilled in the art to make or use the disclosure. Various modifications to these implementations will be readily apparent to those skilled in the art, and the generic principles described herein can be applied to other implementations without departing from the spirit or scope of the disclosure. For example, although the examples show two cutting stations and one sorter, any number of cutting stations and sorters can be used. Thus, it will be understood that the description and drawings presented herein represent implementations of the disclosure and are therefore representative of the subject matter which is broadly contemplated by the present disclosure. It will be further understood that the scope of the present disclosure fully encompasses other implementations that may become obvious to those skilled in the art and that the scope of the present disclosure is accordingly limited by nothing other than the appended claims.

Accordingly, the foregoing implementations are merely presented as examples and are not to be construed as limiting the present disclosure. The present teachings can be readily applied to other types of apparatus and/or devices. The description of the present disclosure is intended to be illustrative, and not to limit the scope of the claims. Many alternatives, modifications, and variations will be apparent to those skilled in the art.

What is claimed is:

1. A method of producing a letterbox for a three-dimensional signage display using a strip of material, the method comprising:

receiving and bending, at a bender, the strip of material for the three-dimensional signage display into a desired shape of a letterbox including flanges and notches, the strip of material having a first end and a second end, wherein the bender includes a puncher, wherein the three-dimensional signage display is completed when a base plate is installed into the letterbox, wherein the letterbox is a letter-shaped box;

bending, at the bender, the first end of the strip of material slightly to produce a step-down bend so that the second end can be positioned next to the first end for attachment to produce the desired shape of the letterbox;

measuring, at the bender, a first plurality of hole positions on the first end of the strip of material, a second plurality of hole positions on the second end of the strip of material, and a third plurality of hole positions on the flanges of the strip of material, wherein the first plurality of hole positions on the first end are measured to match the second plurality of hole positions on the second end of the strip of material after the strip of material is bent into the desired shape of the letterbox;

automatically punching, at the puncher, a first plurality of holes on the first end according to the first plurality of hole positions during the bending of the strip of material for the three-dimensional signage display into the desired shape of the letterbox;

automatically punching, at the puncher, a second plurality of holes on the second end according to the second plurality of hole positions during the bending of the strip of material for the three-dimensional signage display into the desired shape of the letterbox; and automatically punching, at the puncher, a third plurality of holes on the flanges according to the third plurality of hole positions during the bending of the strip of material for the three-dimensional signage display into the desired shape of the letterbox.

2. The method of claim 1, further comprising measuring and cutting, at the bender, the strip of material into a predetermined length that matches a perimeter length of the letterbox.

3. The method of claim 1, further comprising:
measuring a fourth plurality of hole positions on the base plate to match the third plurality of hole positions on the flanges; and
automatically punching, at the puncher, a fourth plurality of holes on the flanges according to the fourth plurality of hole positions.

4. The method of claim 1, wherein a depth of the step-down bend is on an order of the thickness of the strip of material so that the second end can be positioned next to the first end for attachment to produce the desired shape of the letterbox with a smooth surface at a connection point between the first end and the second end.

5. The method of claim 1, further comprising producing a plurality of notches of different angles using a rotatable V-cutter including a plurality of differently-sized punches.

6. The method of claim 1, wherein the strip of material is metallic material including one of aluminum or steel.

7. The method of claim 1, wherein the strip of material is non-metallic material including plastic.

* * * * *